(12) United States Patent
Lyons et al.

(10) Patent No.: US 11,099,375 B2
(45) Date of Patent: Aug. 24, 2021

(54) REMOTE INSPECTION DEVICE

(71) Applicant: Inspectron, Inc., Novi, MI (US)

(72) Inventors: Brent F. Lyons, Howell, MI (US); Tye L. Newman, Howell, MI (US); Shepherd H. Whitcomb, Ann Arbor, MI (US)

(73) Assignee: Inspectron, Inc., Novi, MI (US)

( * ) Notice: Subject to any disclaimer, the term of this patent is extended or adjusted under 35 U.S.C. 154(b) by 410 days.

(21) Appl. No.: 15/412,532

(22) Filed: Jan. 23, 2017

(65) Prior Publication Data

US 2017/0131538 A1 May 11, 2017

Related U.S. Application Data (62) Division of application No. 14/151,146, filed on Jan. 9, 2014, now Pat. No. 9,551,863.

(60) Provisional application No. 61/750,799, filed on Jan. 9, 2013.

(51) Int. Cl.
   *G02B 23/24* (2006.01)
   *H04N 5/225* (2006.01)
   *H04N 7/18* (2006.01)

(52) U.S. Cl.
   CPC ..... *G02B 23/2484* (2013.01); *G02B 23/2476* (2013.01); *H04N 5/2252* (2013.01); *H04N 7/183* (2013.01); *H04N 7/185* (2013.01); *H04N 2005/2255* (2013.01)

(58) Field of Classification Search
   CPC .................................................. G02B 23/2484
   See application file for complete search history.

(56) References Cited

U.S. PATENT DOCUMENTS

| 4,614,395 | A | | 9/1986 | Peers-Trevarton |
| 4,658,664 | A | | 4/1987 | Jacobs |
| 5,354,291 | A | | 10/1994 | Bales et al. |
| 5,364,031 | A | * | 11/1994 | Taniguchi ............ B05B 7/0062 239/330 |
| 5,364,351 | A | | 11/1994 | Heinzelman |
| 5,490,015 | A | | 2/1996 | Umeyama et al. |
| 5,507,297 | A | | 4/1996 | Slater et al. |
| 5,664,710 | A | | 9/1997 | Lam |
| 5,673,841 | A | | 10/1997 | Schulze |
| 5,797,537 | A | | 8/1998 | Oberlin |
| 6,443,973 | B1 | | 9/2002 | Whitman |
| 6,579,311 | B1 | | 6/2003 | Makower |

(Continued)

FOREIGN PATENT DOCUMENTS

WO     WO 2007/029242 A1     3/2007

OTHER PUBLICATIONS

Notification of Transmittal of the International Search Report and the Written Opinion of the International Searching Authority, International Application No. PCT/US2014/010809, dated Dec. 1, 2014.

(Continued)

*Primary Examiner* — Mohammad J Rahman
(74) *Attorney, Agent, or Firm* — Dickinson Wright PLLC (57) ABSTRACT

A portable inspection unit is provided. The portable inspection unit may include a unit body, a flexible cable, and an imager housing. The flexible cable may extend from the unit body and the imager housing may be disposed at a distal end of the flexible cable. The portable inspection unit may be configured to receive an actuating accessory.

20 Claims, 11 Drawing Sheets

(56) References Cited

U.S. PATENT DOCUMENTS

| | | |
|---|---|---|
| 6,843,403 B2 | 1/2005 | Whitman |
| 7,156,846 B2 | 1/2007 | Dycus |
| 7,552,854 B2 | 6/2009 | Wixey |
| 2001/0041869 A1 | 11/2001 | Causey |
| 2001/0052930 A1 | 12/2001 | Adair et al. |
| 2002/0017362 A1* | 2/2002 | Covert ............... B32B 5/18 156/290 |
| 2003/0009085 A1 | 1/2003 | Arai et al. |
| 2003/0065358 A1 | 4/2003 | Frecker et al. |
| 2003/0065359 A1 | 4/2003 | Weller |
| 2003/0083674 A1 | 5/2003 | Gibbens |
| 2003/0158061 A1* | 8/2003 | Ahmadi ............. C10L 10/06 510/185 |
| 2003/0181917 A1 | 9/2003 | Gertner |
| 2003/0212308 A1 | 11/2003 | Bendall |
| 2004/0011358 A1* | 1/2004 | Smaldone ........... A61M 15/00 128/200.24 |
| 2004/0034369 A1 | 2/2004 | Sauer |
| 2004/0042967 A1* | 3/2004 | Adjei ................. A61K 9/008 424/45 |
| 2004/0102783 A1 | 5/2004 | Sutterlin |
| 2005/0049613 A1 | 3/2005 | Brown |
| 2005/0261674 A1 | 11/2005 | Nobis |
| 2006/0155168 A1 | 7/2006 | Pease |
| 2006/0281970 A1 | 12/2006 | Stokes et al. |
| 2007/0068990 A1 | 3/2007 | Shelton |
| 2007/0093790 A1 | 4/2007 | Downey |
| 2008/0026647 A1 | 1/2008 | Boehnlein |
| 2008/0033450 A1 | 2/2008 | Bayer et al. |
| 2008/0283255 A1* | 11/2008 | DuBrucq ........... A62C 99/0018 169/5 |
| 2008/0300462 A1 | 12/2008 | Intoccia |
| 2008/0308602 A1 | 12/2008 | Timm |
| 2008/0319524 A1 | 12/2008 | Yachia |
| 2009/0149716 A1 | 6/2009 | Diao et al. |
| 2010/0004509 A1 | 1/2010 | Naito et al. |
| 2010/0057108 A1 | 3/2010 | Spivey |
| 2010/0179540 A1 | 7/2010 | Marczyk |
| 2010/0191053 A1 | 7/2010 | Garcia et al. |
| 2010/0256523 A1 | 10/2010 | Uznanski |
| 2010/0286544 A1* | 11/2010 | Tanaka ............. A61M 39/0247 600/532 |
| 2011/0243323 A1 | 10/2011 | Sato |
| 2012/0041436 A1 | 2/2012 | Ullrich |
| 2012/0053406 A1 | 3/2012 | Conlon |
| 2012/0109185 A1 | 5/2012 | Fleenor |
| 2012/0165802 A1 | 6/2012 | LaLonde |
| 2012/0206591 A1 | 8/2012 | Selby |
| 2013/0085442 A1* | 4/2013 | Shtul ................. A61M 3/0283 604/28 |
| 2013/0274553 A1 | 10/2013 | Piskun |
| 2014/0135805 A1 | 5/2014 | Windgassen |
| 2014/0207406 A1 | 7/2014 | Domke |
| 2014/0243587 A1 | 8/2014 | Rohaninejad |

OTHER PUBLICATIONS

European Search Report, Application No. 14738134.7, dated Oct. 25, 2016.

* cited by examiner

FIG. 13

REMOTE INSPECTION DEVICE

CROSS REFERENCE TO RELATED APPLICATIONS

This application is a divisional of U.S. application Ser. No. 14/151,146 filed Jan. 9, 2014, entitled "Remote Inspection Device" which claims the benefit of U.S. Provisional Patent Application No. 61/750,799 filed Jan. 9, 2013, the content of which is hereby incorporated by reference in its entirety.

FIELD OF THE INVENTION

The present disclosure relates generally to a portable inspection unit and more specifically to a portable inspection unit having a work channel for interchangeable accessories.

BACKGROUND

Borescopes and video scopes for inspecting visually obscured locations are typically tailored for particular applications. For instance, some borescopes have been tailored for use by plumbers to inspect pipes and drains. Likewise, other types of borescopes have been tailored for use by mechanics to inspect interior compartments of machinery being repaired. Special features and functions associated with these applications have driven up the cost for these types of devices. This disclosure provides for an improved borescope having the added flexibility to improve functionality and maintain reduced cost. The statements in this section merely provide background information related to the present disclosure.

DETAILED DESCRIPTION

Figure 1:
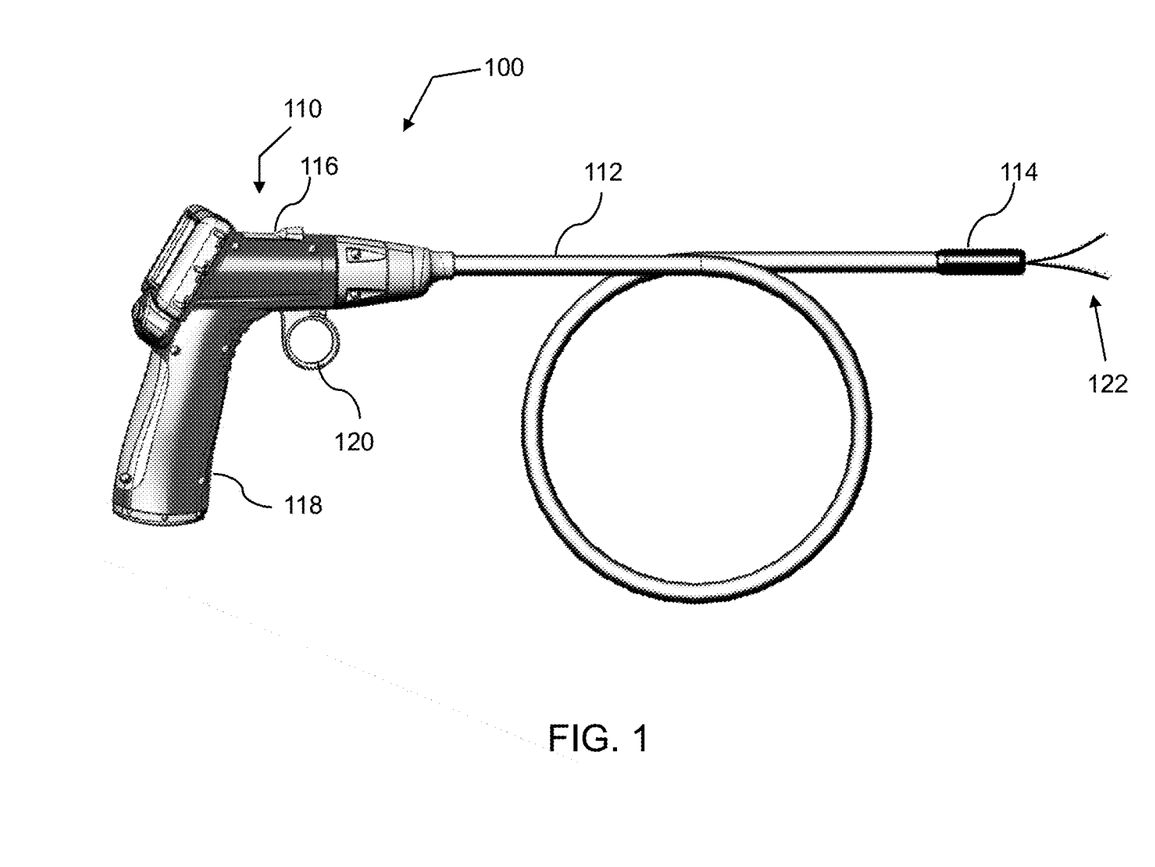
FIG. 1, is a pictorial view of an implementation of a portable inspection unit in accordance with the disclosure.

Referring to FIG. 1, an exemplary implementation of a portable inspection unit 100 is illustrated in accordance with the disclosure. The portable inspection unit 100 may generally comprise three primary components: unit body 110, flexible cable 112 and an imager housing 114. The flexible cable 112 may extend from a distal end portion of the unit body 110 to a proximal end portion of the imager housing and may further provide for mechanical connection and electrical communication between the imager housing 114 and the unit body 110. The portable inspection unit disclosed herein provides for improved adaptability in a range of applications. As discussed in further detail throughout this disclosure, the portable inspection unit and its various components provide for an adaptable inspection tool that may be used for viewing and accessing obscured locations with various accessories.

The unit body may further comprise a surface portion having an access port 116, a handle 118, and a trigger mechanism 120. The unit body may provide for an ergonomic design allowing for ease of access to the trigger mechanism and single handed operation. In this implementation, the portable inspection unit may further comprise a grasper accessory (grasper) 122 extending from the distal end portion of the imager housing 114. The grasper may comprise a plurality of tines suitable for grasping various objects that may be encountered during operation of the portable inspection unit. The grasper accessory may generally be incorporated in the inspection unit by passing through a work channel comprising an elongated passageway extending from the unit body, through the flexible cable and passing through the imager housing. The grasper may further be configured to connect to the trigger mechanism of the unit body to engage actuation of the grasper. Though the grasper accessory is demonstrated in this implementation, the work channel may be configured to receive various accessories compatible with portable inspection unit.

Figure 2:
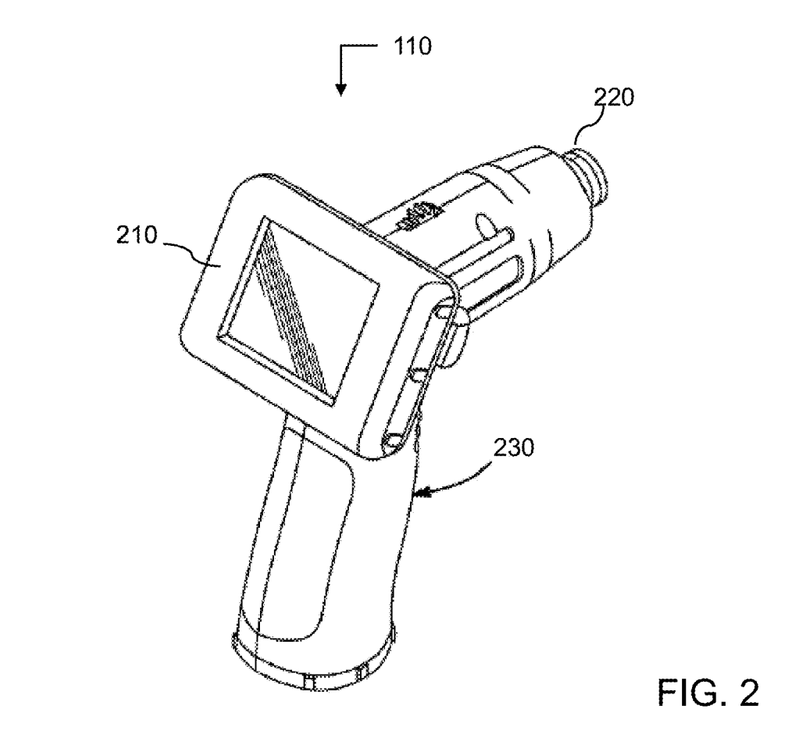
FIG. 2 is a pictorial view of an implementation of a unit body of the portable inspection unit in accordance with the disclosure.

Referring now to FIG. 2, the unit body 110 may further comprise a display housing 210 having an imager display, a user interface, and a handle portion. The unit body may be configured to allow an operator to hold the handle 230 and engage the user interface or depress the trigger mechanism through single handed operation. The unit body may further comprise a distal end portion which may include a distal flange configured to removably attach to the flexible cable. The distal flange 220 may comprise any mechanical attachment but may comprise a plurality of threads forming a male connector. During operation, an operator may hold the handle portion of the portable inspection unit and adjust settings relating to images received on the imager display.

Figure 3:
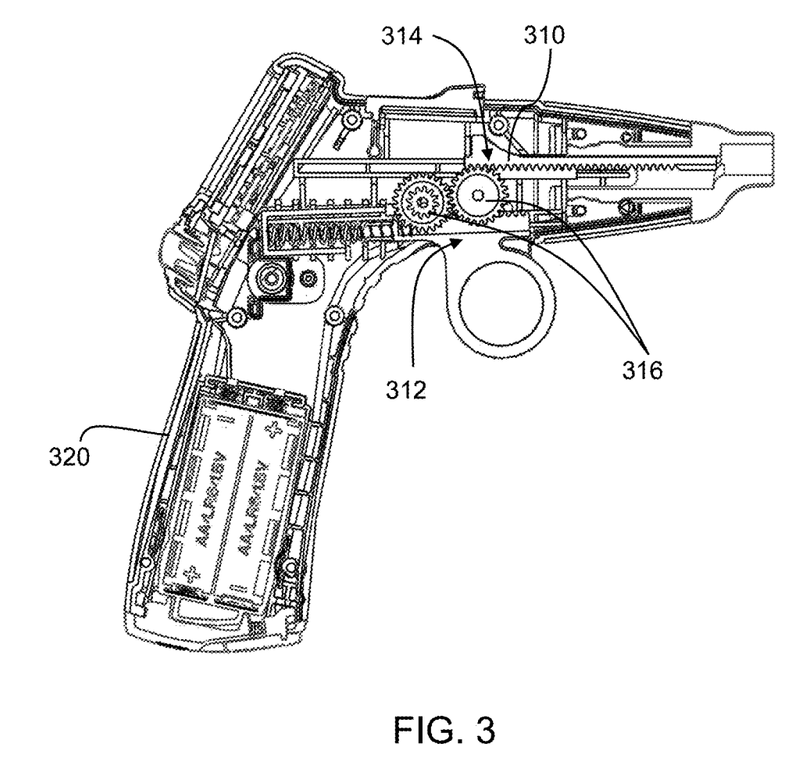
FIG. 3 is a cross-sectional profile view of the unit body of the portable inspection unit in accordance with the disclosure.

Referring now to FIG. 3, a cross-sectional profile view of the unit body as illustrated in conformance with the disclosure. The trigger mechanism may define the engaging portion of a drive assembly. The drive assembly may further comprise a drive unit 312, an actuating unit 314, and a plurality of gears 316. The drive unit 312 may be configured such that upon engagement of the trigger mechanism, the drive unit 312 may be drawn toward the handle 320, and the plurality of gears 316 may be engaged by a drive rack portion of the drive unit 312. Actuation of the drive unit 312 may cause rotation in the plurality of gears 316 and further engage an actuating rack 310 of an actuating unit 314. The actuating unit 314 comprises a proximal end portion and a distal end portion and may be arranged in the unit housing assembly such that the he proximal end portion is significantly aligned with the port in the surface portion of the unit body. The actuating unit extends from the proximal end portion along a sloped surface and extends toward the distal flange of the unit body. The internal passageway comprising a work channel may be defined as the path from the port, extending along the actuating unit from the proximal end portion to the distal end portion and passing outward through the distal flange. The arrangement of the work channel in the disclosed device provides for a readily accessible passage through the unit body and into the flexible cable to implement various accessories some of which are discussed in more detail below.

Figure 4:
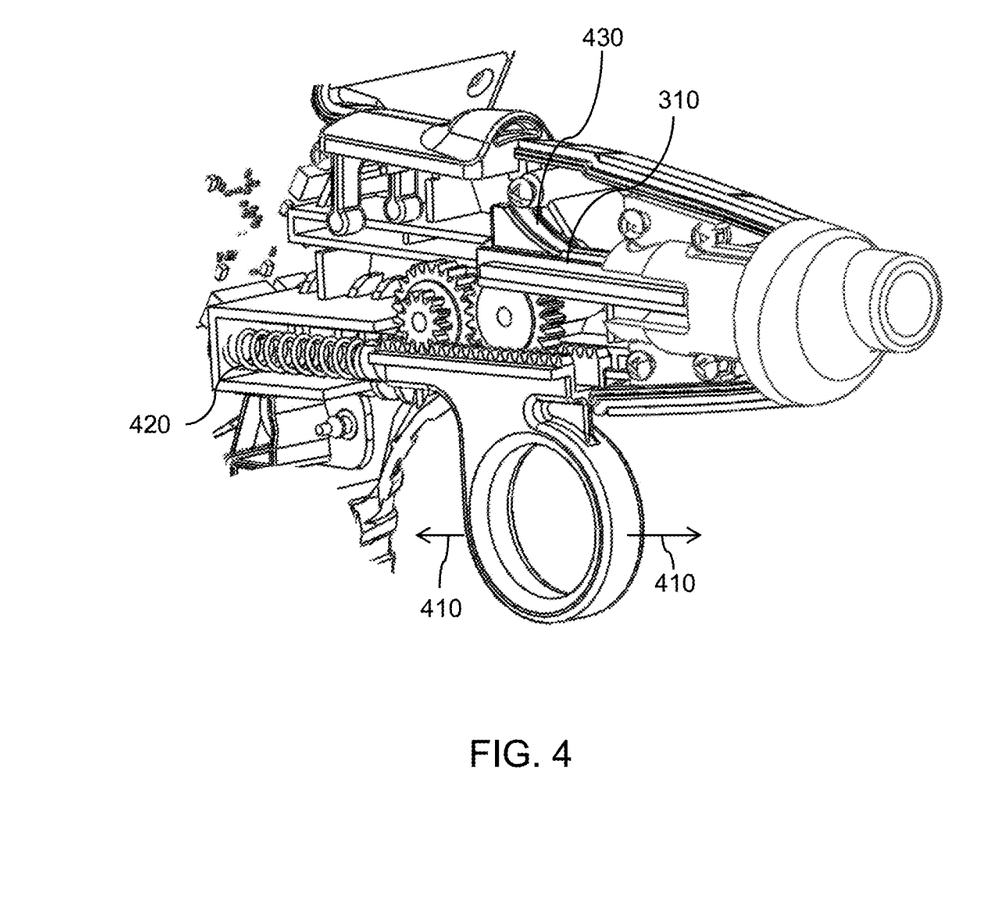
FIG. 4 is a partially transparent projected view of the unit body of the portable inspection unit in accordance with the disclosure.

Referring now to FIG. 4, a partially transparent projected view of the unit body in conformance with the teachings of the disclosure is illustrated. The trigger mechanism may be actuated through a linear motion denoted by the illustrated arrows 410. Though linear operation is implemented in the instant implementation, other variations of the trigger mechanism may include any form of motion including a rotary motion may be applied to engage other implementations. The trigger mechanism of this implementation may be configured such that if the trigger mechanism is drawn toward a handle of the unit body, a spring 420 may be compressed. Upon actuation of the trigger mechanism, the drive gear may rotate due to its engagement with the driving rack. Rotation of the drive gear further may cause rotation in the actuating gear which may further engage the actuating rack 310 of the actuating unit and cause the actuating unit to translate along a bounded path to or from the distal and proximal portions of unit body.

The drive assembly may preferably be configured to cause translation of the actuating rack in the same direction as the drive unit. This configuration may provide the advantage of allowing the operator to have greater control over the motion of the drive assembly and similarly improved control over any accessory attached to the actuation unit. Upon release of the trigger mechanism, the spring may return the drive unit to an extended position, and consequently, return the actuating unit driven by the plurality of gears to an extended position.

The channel portion of the actuating unit may be clearly viewed in this figure, further illustrating the proximal end portion aligning with the port disposed on the surface of the unit body. Extending from the proximal end portion the longitudinally sloped channel 430 may further be demonstrated in this implementation as providing a work channel providing a smooth path extending from the proximal end to the distal end through the unit body. The distal flange of the unit body further may comprise the internal passageway passing through the flange disposed in the distal end portion of the unit body and significantly aligning with the channel portion of the actuating unit. When an actuating device is connected to the actuation unit, movement in the actuating unit may cause the device to translate and extend in and out of the distal end portion of the unit body through the internal passageway.

Figure 5:
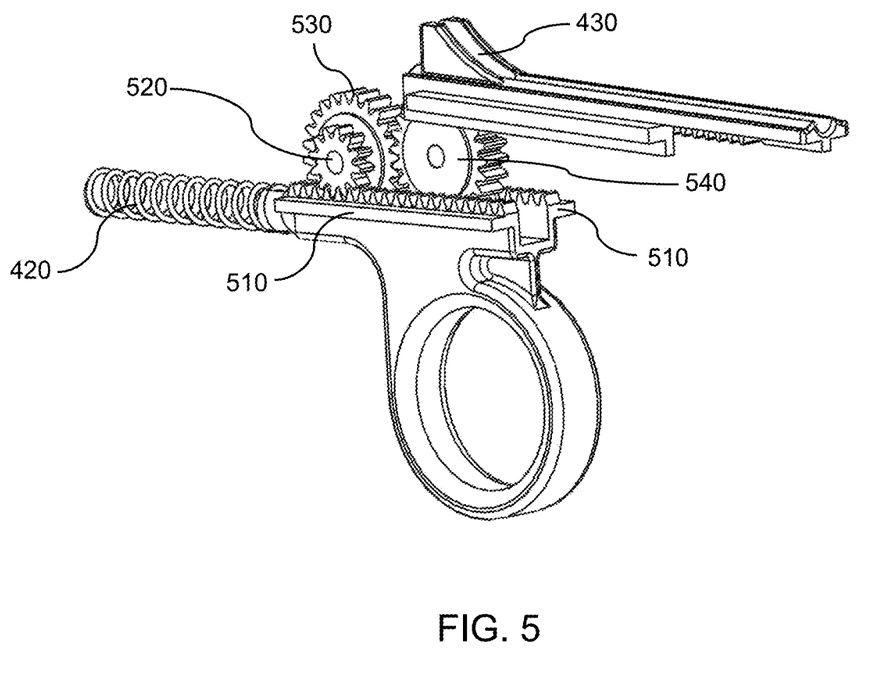
FIG. 5 is a detailed assembly view of the trigger mechanism and drive assembly of the portable inspection unit in accordance with the disclosure.

Referring now to FIG. 5, a detailed assembly view of the trigger mechanism is illustrated in conformance with the teachings of the disclosure. Shown here in further detail, the drive unit of the trigger mechanism may further comprise a pair of guide rails 510 running along a longitudinal axis of the drive unit on each side drive rack. The drive rack may further be configured to slide along the guide rails parallel to the longitudinal axis of the drive unit. The drive unit may engage a reduced spur gear 520 being interconnected to an enlarged spur gear 530, comprising a scaling drive gear. The scaling drive gear may engage an actuation gear 540 and the rotation caused among the plurality of gears by the drive unit may further cause translation in the actuating rack of the actuating unit. The actuating unit may also comprise a pair of guide rails on either side being aligned with a longitudinal axis of the actuating rack. Shown here in further detail, the actuating unit comprises the proximal end portion and a distal end portion having a sloped channel originating near the proximal end portion, sloping downward, and tangentially meeting the guide channel. At the proximal end portion of the sloped channel, a constraint groove may be disposed and configured to releasably attach a crimped feature of an actuating accessory. The scaling drive gear, the actuation gear, combined with the drive rack and the actuating rack may further comprise a motion scaling assembly being configured to increase the output motion of the actuation unit relative to the input motion of the trigger and drive unit. The ratio of motion generated by the scaling drive gear between the input or drive unit and the output or actuating unit may be greater than 1:1 and in some embodiments is greater than 1.5:1. Increasing the output motion of the actuating unit and consequently any actuating accessory may provide the benefit of reducing the motion of the operator in pulling the trigger to achieve actuation in an attached accessory with less input motion. An output ratio greater than 1:1 may be useful in some industrial applications where large objects require significant movement by the grasper Referring now to FIG. 6, a pictorial view of the unit body focusing on the surface portion is illustrated in conformance with the teachings of the disclosure. The port disposed in the surface portion may be configured to substantially aligned with the sloped channel of the actuating unit and allow access to a constraint groove 610 configured for releasably attached a crimped feature of the actuating accessory. However, other attachment means may be used, for example a loop and hook or ball and coupling, to secure the grasper to the actuation unit. When detached from the actuation unit, the grasper may be removed from the portable inspection device for example through the opening where the internal passageway meets the distal end of the imager housing or the port on the outer surface portion of the unit body. The port on the outer surface portion of the unit body provides access to the grasper, or another actuating accessory to be received by the work channel. One configuration of the work channel in relation to the various components of the portable inspection unit is more clearly illustrated in FIG. 12.

Figure 6:
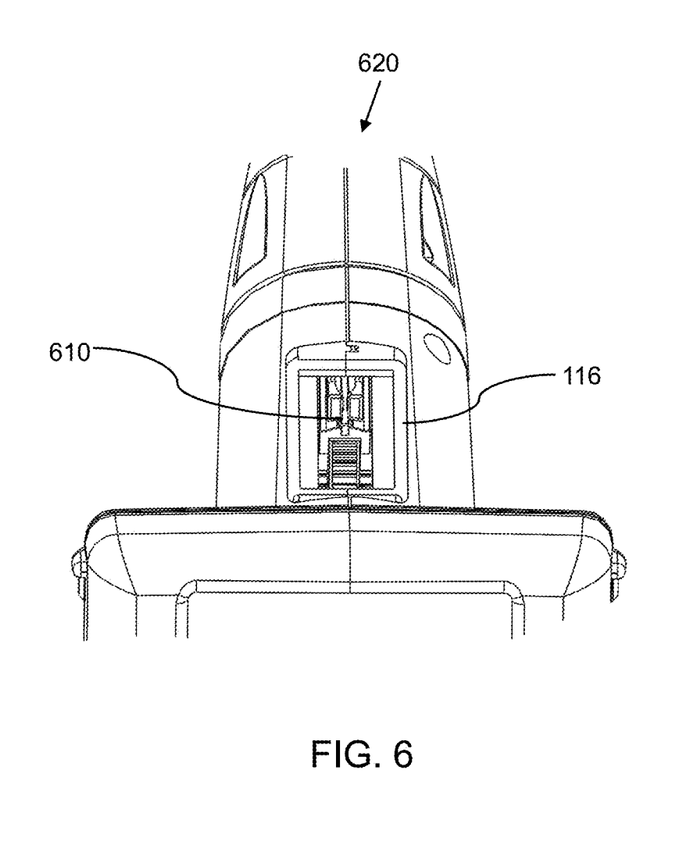
FIG. 6 is a pictorial view of the unit body focusing on the surface portion of the unit body of the portable inspection unit in accordance with the disclosure.

The imager housing and imager display are further illustrated to provide a reference of the view depicted. During operation of the inspection unit the work channel 620, designated by the hidden lines shown, may be accessible through the port even when the flexible cable is attached to the inspection unit. The access port 116 may provide users with the ability to change actuating accessories for use with the portable inspection unit without disconnecting any other components of the inspection unit including the flexible cable and the imager housing. A further benefit of this implementation may include the operator being able to change between actuating accessories while the imager housing remains focused on an obscured location, for example if the imager housing and the flexible cable are disposed in a pipe, shaft, or other area that may be difficult to reach if changing the accessory required removal of the imager housing or flexible cable.

Figure 7:
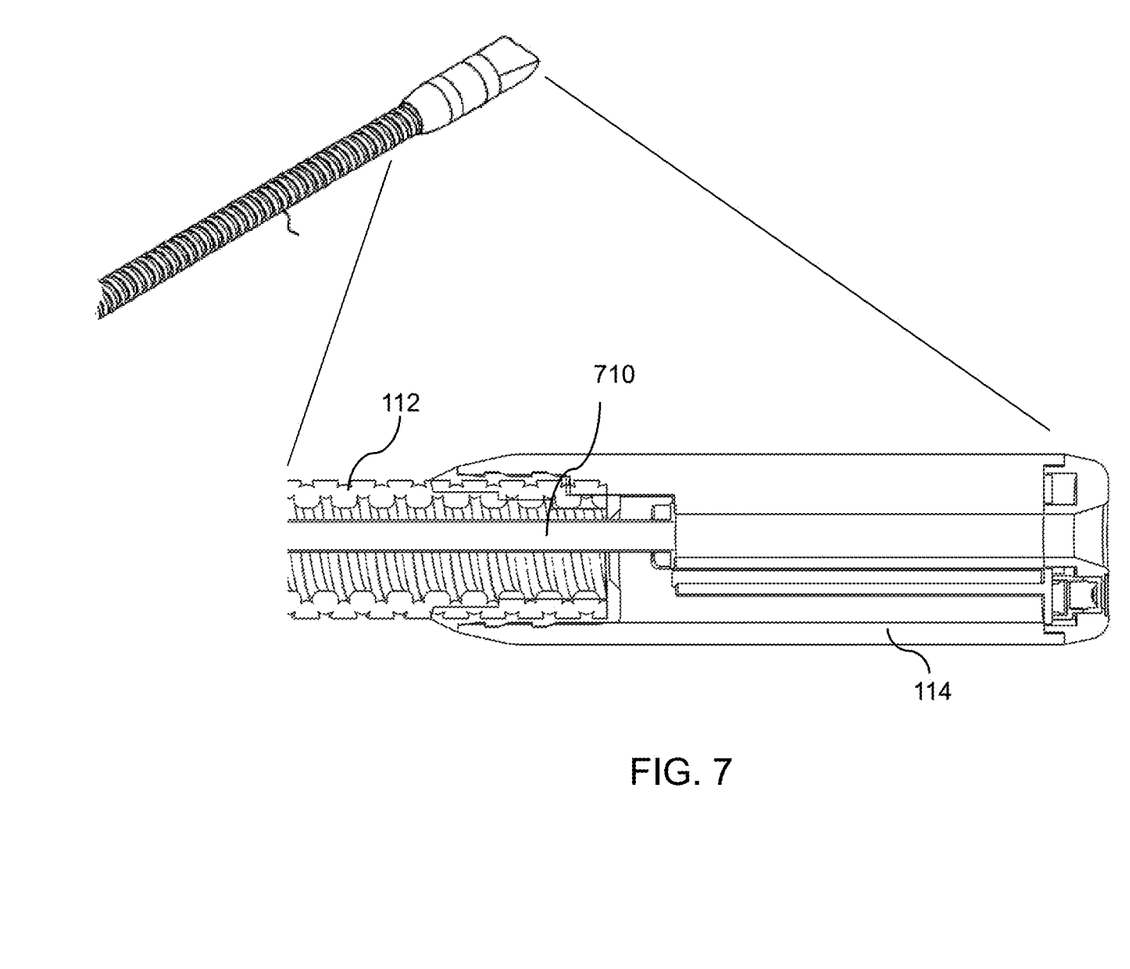
FIG. 7 is a detailed cross-sectional view of the imager housing attached to the flexible cable of the portable inspection unit in accordance with the disclosure.

Referring now to FIG. 7, a detailed cross-sectional view of the imager housing 114 attached to the flexible cable 112 is shown in conformance with the teachings of the disclosed disclosure. The imager housing 114 may comprise an internal passageway 710 configured to receive an actuating device. The internal passageway 710 may be significantly centered along a longitudinal axis of the imager housing 114 and extend along a longitudinal axis of the flexible cable 112. An imager unit may further be disposed in the imager housing extending along an outer portion of the imager housing proximate to a distal end of the imager housing.

Opposite the imager unit, a lighting unit may further be disclosed within the imager housing and also extends along the longitudinal axis of the imager housing to the distal end. The lighting unit in this implementation is shown opposite the imager unit, but in other implementations the imager unit and light unit may be oriented in various configurations about the imager housing, for example the imager unit and lighting unit may be side-by-side or alternately spaced about the longitudinal axis of the imager housing. A plurality of wires may extend along the longitudinal axis of the flexible cable and into the internal passageway of the imager housing. The wires may supply the lighting unit with power and provide electrical communication from any electronic device disposed proximate to the imager housing. The imager unit may be configured to communicate or record images or video to the display and memory that may be disposed in the unit body. The lighting unit may provide light in a working area around the distal end of the imager housing and illuminate the working area so that the imager may capture images in darkened locations. A barb may form an angle with the leg of the tine which is greater than 80 degrees and in some implementations greater than 100 degrees.

Figure 8:
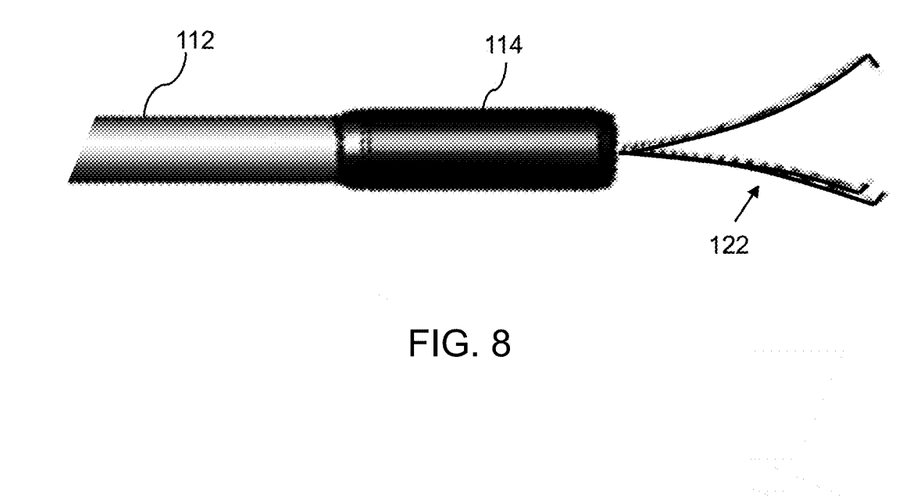
FIGS. 8 and 9 are detail pictorial views of the imager housing and flexible cable receiving an actuating device in the form of a grasper in accordance with the disclosure.
Figure 9:
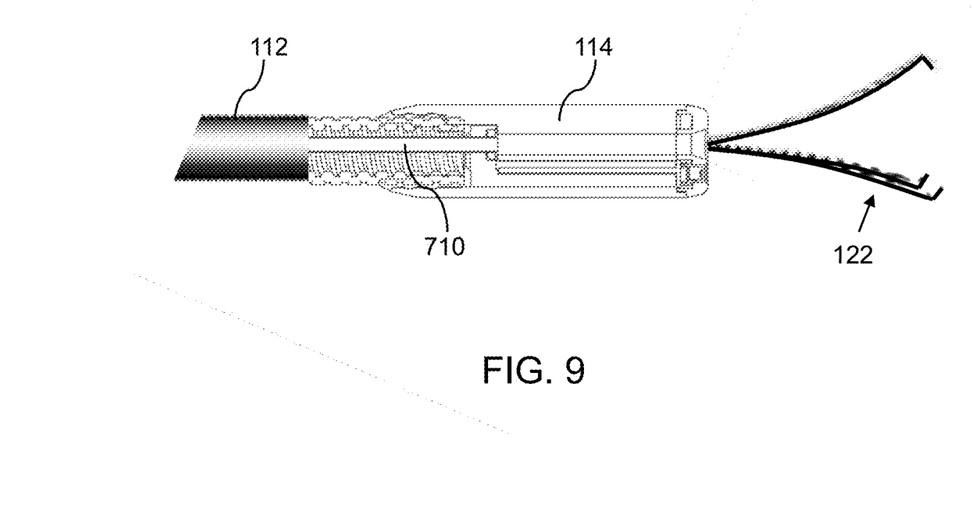

Referring now to FIGS. 8 and 9, the imager housing 114 and flexible cable 112 are shown receiving an actuating device in the form of the grasper 122. The grasper 122 shown may comprise a plurality of tines. In a preferred implementation the grasper 122 comprises three tines extending from the internal passageway 710 proximate to the distal end of the imager housing 114. The tines may further extend outward along a smooth curve and may also be evenly spaced radially about a longitudinal axis of the imager housing. Each of the tines may further comprise at least one barb proximate to a distal end portion. In some implementations, each barb may comprise a single point, while in others, a plurality of raised ridges may be disposed at the distal end of each tine to form a plurality of barbs.

At a proximal end portion, each of the tines may merge together to form a single draw wire portion. The draw wire may be disposed in the internal passageway passing through the imager housing and the length of the flexible cable into the unit body. Once inside the unit body, the draw wire may extend along the channel portion of the actuating unit to the distal end where it may be constrained or attached to a constraint groove at the proximal end of the sloped channel. Upon actuation of the drive assembly, the draw wire may be pulled into the unit body by the actuating unit. Resulting from the motion of the actuating unit, the draw wire may retract the tines into the imager housing further causing the distal end portions of the tines comprising the barbs to diverge. Through this motion, an object near the distal end portion may be engaged and held by the tines of the grasper. This functionality may allow for the removal of various objects that may be viewed be the imager unit in locations otherwise obscured from view. In some cases an alternate grasping unit may also be used for placement of objects in confined areas or areas obscured from view.

To ensure that a variety of objects may be engaged by with the grasper are the plurality of tines may be evenly spaced and diverge outward radially in a smoothed curved path or may be configured for other applications requiring other spacing. In other implementations the tines may be magnetized to allow for the capture of ferromagnetic materials.

Figure 10:
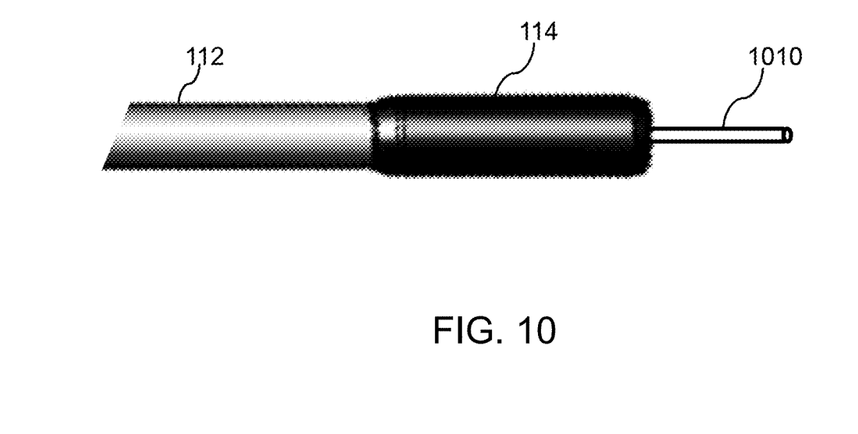
FIGS. 10 and 11 are detail pictorial views of the imager housing and flexible cable receiving an accessory in the form of a fluid dispersion tube in accordance with the disclosure.
Figure 11:
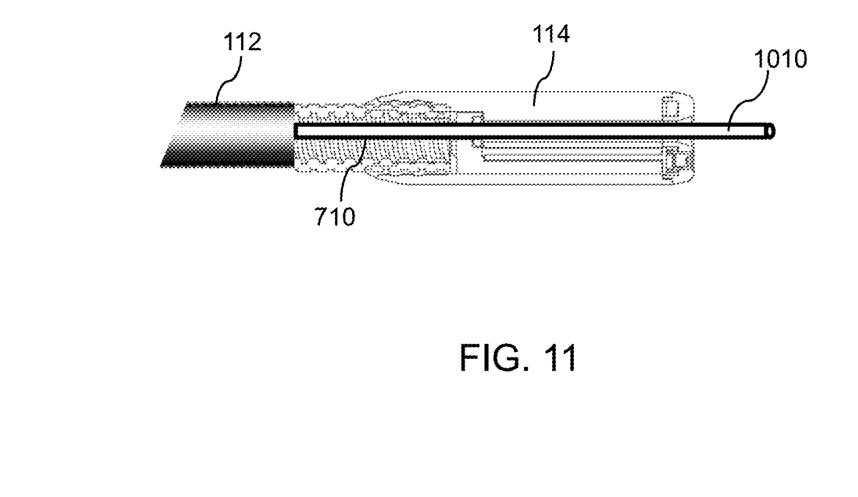

Referring to FIGS. 10 and 11, the imager housing 114 and flexible cable 112 are shown receiving an actuating device in the form of a fluid dispersion tube 1010. The fluid dispersion tube 1010 may be utilized as another form of accessory that may be received in the internal passageway 710 passing through the portable inspection device. Similar to the grasper, the fluid dispersion tube 1010 may pass through the unit body, being guided by the work channel, and through the internal passageway 710 passing through the flexible cable 112 and the imager housing 114. The fluid dispersion tube 1010 may provide the portable inspection unit with the capability to deliver fluids or gasses from a distal end portion of the fluid dispersion tube accessible near the port of the unit body to a distal end of the fluid dispersion tube extending through the internal passageway of the imager housing through the distal opening.

The fluid dispersion tube 1010 may provide the capability to deliver many fluids or gasses, and in some implementations may be compatible with many standard aerosol canisters. Some of the product that may be delivered by the fluid dispersion tube include automotive lubricants, pesticides, industrial chemicals, household products and cleaners, etc. The fluid dispersion tube generally may be composed of a semi-flexible resilient material that is resilient to fatigue and wear, but in some applications specialized materials may be required to ensure capability with chemicals that may be caustic, acidic, etc.

Figure 12:
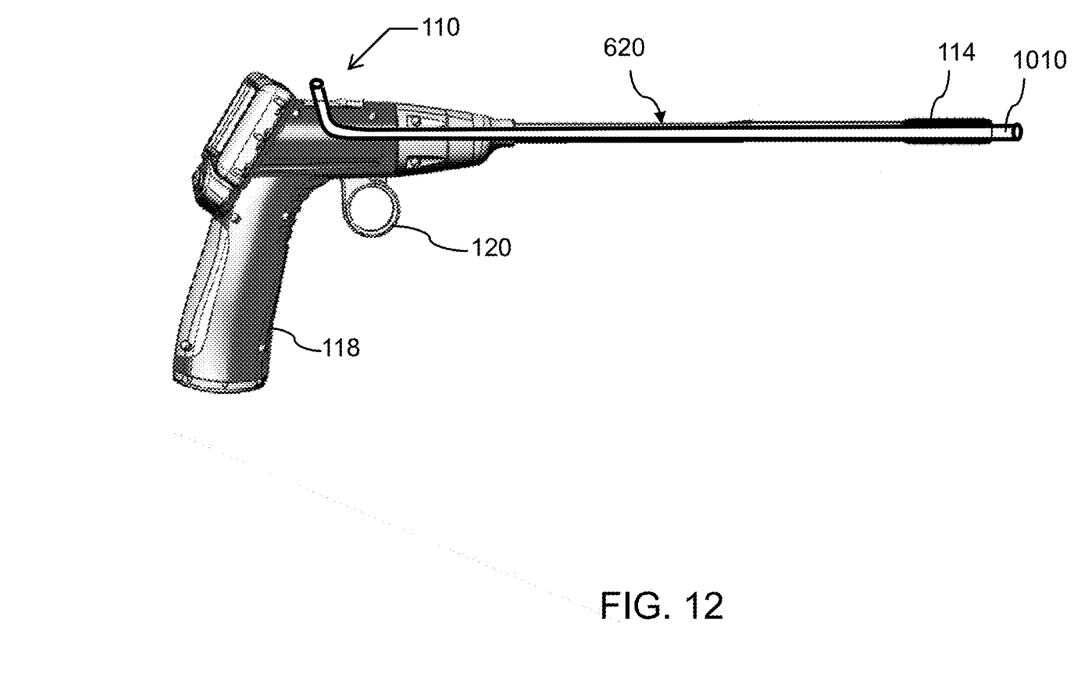
FIG. 12 is a partially transparent pictorial view focusing on the work channel of the portable inspection unit in accordance with the disclosure.

Referring to FIG. 12, a partially transparent pictorial view of the portable inspection unit is illustrated. The fluid dispersion tube 1010 may clearly be seen in this view having a proximal end portion extending from the port of the unit body 110 to the distal end of the imager housing 114. This view also may further emphasize the path of the work channel 620 passing through the unit body 110 and extending through the flexible cable 112 and the imager housing. The work channel 620 provides for a path for an actuating device similar to the grasper and any other accessory that may be commonly used for fluid delivery, cleaning, scraping, polishing etc. The work channel may be configured to allow operators to accessories such as the grasper or the fluid dispersion tube from either the proximal, unit body end or the distal imager housing end of the portable inspection device. The work channel may be constructed of PTFE (Teflon™) or implementations, other materials may be suitable. The ease of interchangeability among the various accessories that may be received by the work channel provides for a flexible, yet cost effective design allowing for the portable inspection unit to be suited to a wide variety of applications.

Figure 13:
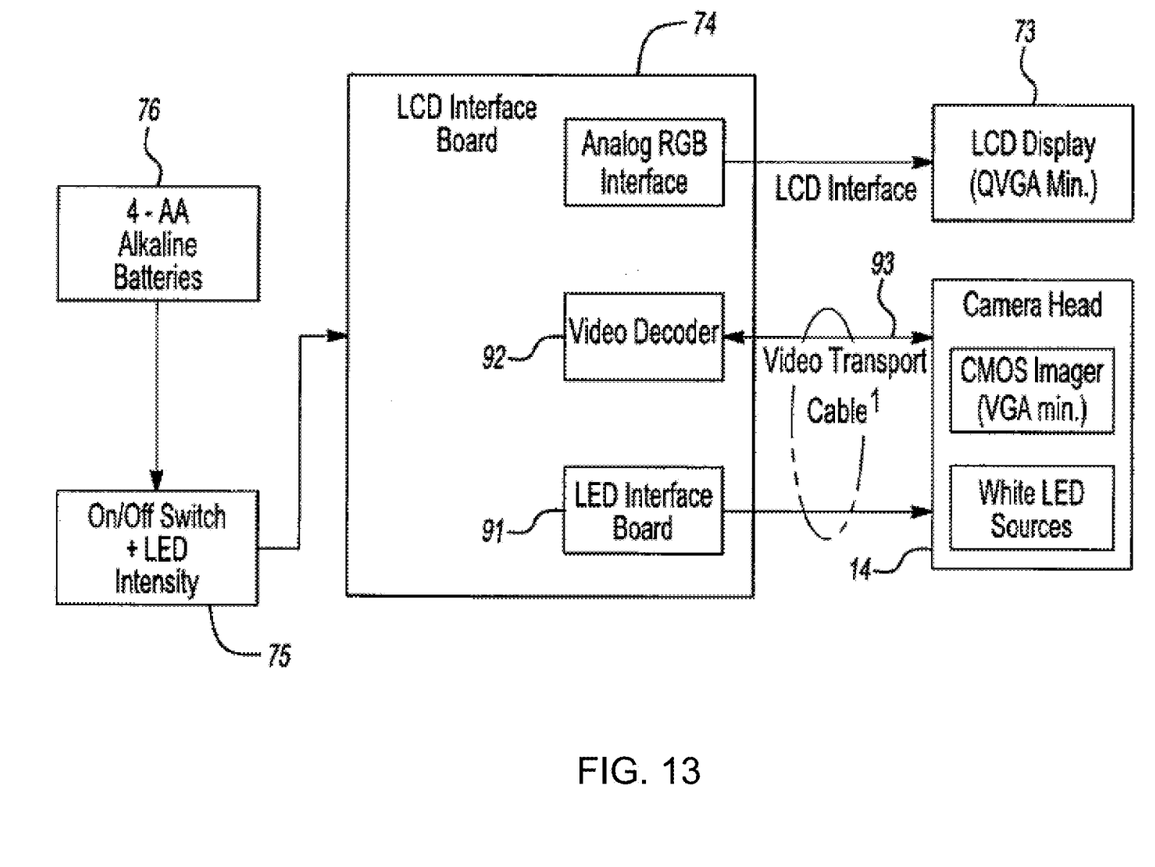
FIG. 13 is a block diagram of operational components which may be utilized in the portable inspection unit in accordance with the disclosure.

Referring to FIG. 13, a schematic of an implementation of electronic aspects that may be utilized in the portable inspection unit is shown. The power switch 75 may be interposed between the power source 76 and the remaining operational components. When actuated by an operator to an ON position, power may be supplied from the power source 76 to the interface board 74. The interface board 74 in turn may power the display device 73 and the imaging unit 22. In the one implementation, the power switch 75 may further be operable to control the intensity of the lighting unit which may comprise LEDs. To do so, power may also supplied to an LED interface board 91. The LED interface board 91 may in turn send a control signal to the LEDs based on the setting of the power switch 75. The operator may adjust the illumination of the viewing area, thereby improving the quality of the acquired images from the imaging unit. Alternative embodiments of the inspection device may employ other user actuated controls. For example, the portable inspection unit may include controls for the contrast of the display device, on-screen display or for a zoom function of the imaging device.

Once powered on, the imager unit may 22 begin capturing images and transmitting the image data as a video signal to a video decoder 92 residing on the interface board 74. The video decoder 92 decodes the video signal and passes it through another interface to the display device 73. The display device 73 is then operable to display the video images to the operator.

As a person skilled in the art will readily appreciate, the above description is meant as an illustration of the principles of this disclosure. This description is not intended to limit the scope or application of this disclosure in that the disclosure is susceptible to modification, variation and change, without departing from spirit of this disclosure, as defined in the following claims.

What is claimed is:

1. A portable inspection unit comprising:
   a unit body;
   a flexible cable having a proximal end portion and a distal end portion, the proximal end portion extending from the unit body;
   an imager housing disposed at the distal end of the flexible cable; and
   a fluid dispersion tube extending from the unit body to the imager housing through an internal passageway in the flexible cable;
   an aerosol canister connected to the fluid dispersion tube within the unit body configured to propel fluid or gas through the fluid dispersion tube and out of an opening in the imager housing, wherein the opening in the imager housing is located such that the aerosol canister propels a fluid within the field of view of an imager in the imager housing.

2. The portable inspection unit of claim 1, wherein an internal passage extends through the port, into the unit body, through the flexible cable and imager housing, and outward proximate to a distal end portion of the imager housing.

3. The portable inspection unit of claim 1, wherein the internal passageway is coated in Teflon™.

4. The portable inspection unit of claim 1, wherein the internal passageway is also configured to receive an actuating device.

5. The portable inspection unit of claim 4, wherein the actuating device is a grasper.

6. The portable inspection unit of claim 1, wherein the aerosol canister contains a lubricant.

7. The portable inspection unit of claim 1, wherein the aerosol canister contains a pesticide.

8. The portable inspection unit of claim 1, wherein the aerosol canister contains a cleaner.

9. The portable inspection unit of claim 1, wherein the fluid dispersion tube is formed of a semi-flexible resilient material.

10. A portable inspection unit comprising:
    a unit body;
    a flexible cable having a proximal end portion and a distal end portion, the proximal end portion extending from the unit body;
    an imager housing disposed at the distal end of the flexible cable;
    a fluid dispersion tube extending from the unit body to the imager housing through an internal passageway in the flexible cable; and
    an aerosol canister connected to the fluid dispersion tube within the unit body configured to propel fluid or gas through the fluid dispersion tube and out of an opening in the imager housing, wherein fluid dispersion tube extends from a port in the unit body and connects with the aerosol canister.

11. The portable inspection unit of claim 1, wherein fluid dispersion tube extends from a port in the unit body and connects with a nozzle of the aerosol canister.

12. The portable inspection unit of claim 10, wherein an internal passage extends through the port, into the unit body, through the flexible cable and imager housing, and outward proximate to a distal end portion of the imager housing.

13. The portable inspection unit of claim 10, wherein the internal passageway is coated in Teflon™.

14. The portable inspection unit of claim 10, wherein the internal passageway is also configured to receive an actuating device.

15. The portable inspection unit of claim 14, wherein the actuating device is a grasper.

16. The portable inspection unit of claim 10, wherein the aerosol canister contains at least one of a lubricant, a pesticide and a cleaner.

17. The portable inspection unit of claim 10, wherein the fluid dispersion tube is formed of a semi-flexible resilient material.

18. The portable inspection unit of claim 10, wherein fluid dispersion tube connects with a nozzle of the aerosol canister.

19. A portable inspection unit comprising:
    a unit body;
    a flexible cable having a proximal end portion and a distal end portion, the proximal end portion extending from the unit body;
    an imager housing disposed at the distal end of the flexible cable;
    a fluid dispersion tube extending from the unit body to the imager housing through an internal passageway in the flexible cable; and
    an aerosol canister connected to the fluid dispersion tube within the unit body configured to propel fluid or gas through the fluid dispersion tube and out of an opening in the imager housing, wherein the aerosol canister contains at least one of a lubricant, a pesticide and a cleaner.

20. The portable inspection unit of claim 10, wherein the opening in the imager housing is located such that the aerosol canister propels a fluid within the field of view of an imager in the imager housing.

* * * * *